United States Patent [19]

Hannus et al.

[11] Patent Number: 5,385,644
[45] Date of Patent: Jan. 31, 1995

[54] METHOD AND DEVICE FOR INTENSIFYING THE OPERATION OF A YANKEE PRESS IN A SOFT-TISSUE PAPER MACHINE

[75] Inventors: Lars H. M. Hannus; Jens P. Enkvist, both of Turku, Finland

[73] Assignee: Valmet Paper Machinery, Inc., Helsinki, Finland

[21] Appl. No.: 73,101

[22] Filed: Jun. 7, 1993

[30] Foreign Application Priority Data

Jun. 8, 1992 [FI] Finland .................. 922649

[51] Int. Cl.$^6$ .................. D21F 5/18; D21F 5/20
[52] U.S. Cl. .................. 162/207; 162/359.1; 162/375; 34/86; 34/123
[58] Field of Search .......... 162/207, 206, 281, 202, 162/375, 289, 111, 359.1, 290; 34/86, 35, 123

[56] References Cited

U.S. PATENT DOCUMENTS

| | | | |
|---|---|---|---|
| 1,438,511 | 12/1922 | Witham | 162/359.1 |
| 1,995,999 | 3/1935 | Oman | 34/86 |
| 3,560,333 | 2/1971 | Douglas et al. | 162/359.1 |
| 4,351,700 | 9/1982 | Dove | 162/359.1 |
| 5,230,776 | 7/1993 | Andersson et al. | 162/359.1 |

FOREIGN PATENT DOCUMENTS

| | | |
|---|---|---|
| 54956 | 11/1981 | Finland . |
| 2802156 | 6/1979 | Germany . |
| 597653 | 1/1948 | United Kingdom ......... 34/86 |
| 9116493 | 10/1991 | WIPO ......... 162/375 |

Primary Examiner—Peter Chin
Attorney, Agent, or Firm—Steinberg, Raskin & Davidson

[57] ABSTRACT

A method and device for intensifying the operation of a Yankee press in a soft-tissue machine in which a web is pressed in one or several nips formed between a Yankee cylinder and one or more press rolls. The web is dried on the Yankee cylinder by blowing hot air introduced through the Yankee hood against the web. In the method, a blow device is used to blow hot and humid air against the web. The blow air for the blow device is taken from the outlet/heat recovery of the air system of the Yankee hood, and the exhaust air from the blow device is returned to the outlet/heat recovery of the air system of the Yankee hood. Air is blown against the web at the proximity of the nip formed between the Yankee cylinder and the first press roll, before and near the first press nip, in the running direction of the web. The blow device includes a blow chamber, an exhaust chamber, and blow nozzles for blowing hot and humid air against the web and exhaust-air ducts for the removal of the air.

20 Claims, 4 Drawing Sheets

METHOD AND DEVICE FOR INTENSIFYING THE OPERATION OF A YANKEE PRESS IN A SOFT-TISSUE PAPER MACHINE

BACKGROUND OF THE INVENTION

The present invention relates to a method for intensifying the operation of a Yankee press in a soft-tissue paper machine, in which a web is pressed in one or several nips formed between a Yankee cylinder having an overlying Yankee hood and a press roll. The web is dried on the Yankee cylinder by blowing hot air introduced through the Yankee hood against the web. In the method in accordance with the invention, a blow device is used which blows hot and humid air against the web before the web enters into the Yankee press.

The invention also relates to a device for carrying out the method in accordance with the invention to intensify the operation of a Yankee press in a soft-tissue machine, wherein the Yankee press comprises a Yankee cylinder having an associated Yankee hood and one or several press rolls forming nip(s) with the Yankee cylinder. The device comprises a blow device having a blow chamber, an exhaust chamber, and blow nozzles for blowing hot and humid air against the web and exhaust-air ducts for removing the air.

In the manufacture of paper, a fibrous web is formed in the wire part of the paper machine on an endless wire or between two wires. Thereafter, water is drained out of the fiber web in several stages, the first of which is usually achieved by passing the fibrous web over a wire zone provided with suction boxes and also possibly suction rolls. In the wire zone, the suction boxes and/or suction rolls draw water out of the web by means of negative pressure. The fibrous web is then passed to the press section where water is removed out of the web by pressing the web between press rolls. In the press section, the web is usually supported on a felt so that water is also removed out of the felt at the same time, e.g., by making use of felt absorbers operating with negative pressure. After the press section, the web is usually dried by evaporation in the dryer section of the paper machine wherein, e.g., the web runs over a Yankee cylinder provided with a Yankee hood.

In view of the energy economy and desired efficiency of the paper machine, dewatering of the web by mechanical pressing in the press section of a paper machine is substantially more advantageous than drying that takes place by evaporation in the dryer section. The result achieved by drying in the press section also affects the result of the drying in the dryer section.

When water is removed out of the paper web, the web is generally cooled so that the viscosity of the water contained in the fibrous web becomes higher and dewatering of the web in subsequent pressing steps becomes more difficult. Cooling of the web also results in a higher energy requirement in the dryer section. For this reason, attempts have been made to find solutions for heating the web to a suitable temperature so as to lower the viscosity of the water present in the web and, thus, to facilitate the pressing of water out of the web.

In paper machines, steam cylinders, steam boxes, and electric/gas infra-dryers have been used for heating the web. A common feature of these prior art devices is the considerable energy requirements are needed to obtain an adequate temperature of the web.

As is well known in the art, steam cylinders are used in conventional paper machines in which the speed of the paper machine does not impose restrictions for their use. The field of application of steam boxes has been mainly for profiling of the web. In the prior art devices based on steam boxes, an increased capacity of a paper machine has been obtained indirectly by means of a more uniform moisture profile, whereby so-called over-drying can be substantially avoided. However, by means of a steam box, an increase in the capacity of a paper machine cannot be obtained if the profile is uniform. Steam boxes have also been used in multi-nip "Sym-Press" (trade mark) presses between the press nips in order to heat the web.

In the environment of a press section of a paper machine, the use of electric/gas infra-dryers for heating of the web has proved to be quite problematic, because these apparatuses are contaminated rapidly in this area, which deteriorates their efficiency. The contamination is usually caused by loose particles.

A conventional Yankee press comprises a large-diameter Yankee cylinder that is heated from inside and a Yankee hood that consists of one or several blocks and is formed over a part of the circumference of the cylinder. Warm air is blown through the hood against the web in order to dry the web. Before the hood section, a Yankee press usually comprises one or several press rolls which form(s) a press nip(s) together with the Yankee cylinder. In these press nips, water is removed out of the web by pressing.

In the prior art Yankee presses, it is a drawback that it is not always possible to raise the efficiency of the press nips to a sufficiently high level because the web has time to be cooled in the preceding steps so that the viscosity of the water becomes higher and the removal of water in the press nips is not so efficient. This has also resulted in a higher energy requirement for adequately drying the web in view of the drying capacities of the Yankee cylinders and hoods.

Devices and methods are also known in the prior art which are based on air blowing. In these devices and methods, warm and humid air is blown against the web so as to heat the web and to thereby intensify both the pressing and the drying steps. However, in these prior art devices, it is a drawback that relatively low values of humidity and temperature of the air have been used so that the efficiency has been comparatively low.

A particular prior art device based on air blowing in order to intensify the dewatering of a web in a paper, board or pulp machine is described in Finnish Patent Application No. FI 54,956. In this prior art device, warm and humid exhaust air from the dryer section or, as an alternative, warm and humid exhaust air from the pressurized process of a thermo-mechanical pulping plant, has been used to intensify the dewatering of the web.

OBJECTS AND SUMMERY OF THE INVENTION

It is an object of the present invention to provide an improvement and/or intensification of the operation of a Yankee press in a soft-tissue paper machine.

It is another object of the present invention to provide a new and improved method and device for use in a Yankee press in which the drawbacks of the prior art are substantially eliminated.

It is yet another object of the present invention to increase the efficiency of a Yankee press by blowing air against the web to dry the web before the web enters into the Yankee press.

It is still another object of the present invention to lower the viscosity of water present in a web before the web enters into a pressing stage in order to improve the efficiency of the pressing stage.

It is still another object of the present invention to direct exhaust air from a Yankee hood to a blow device and to blow the exhaust air against a web before the web enters into the Yankee hood.

In view of achieving the objects stated above and others, in the method in accordance with the invention, exhaust air is taken from an outlet/heat recovery of the air circulation system of the Yankee hood and directed against the web through a blow device. Exhaust air from the blow device is returned to the outlet/heat recovery of the air circulation system of the Yankee hood. The blow device is arranged to blow air against the web in proximity to a press nip formed between the Yankee cylinder and a first press roll, before and near the press nip, in the running direction of the web.

In the device in accordance with the invention, the blow device has a blow chamber which is connected to the outlet and/or heat recovery of the air system of the Yankee hood. An exhaust chamber in the blow device is connected to the outlet and/or heat recovery of the air system of the Yankee hood for returning the spent air. The blow device is placed in proximity to the nip formed between the Yankee cylinder and the first press roll before and near the first press nip.

In the method of the invention, the web is heated by blowing hot and humid air through the blow device and against the web so that the web is heated both by means of forced convection, and also by the liberation of the evaporation energy of water present in the blow air as it condenses in the surface fibers in the web. This results in a reduction of the viscosity of the water present in the web and in an easier pressing of the water present in the web.

Since the drying of the paper is often a factor that restricts the speed of a paper machine and since the dry solids content of the paper web after the press has an significant effect on the drying, the method and device in accordance with the present invention permit an increased speed of a paper machine with very little additional energy being required. Additional energy is needed only for the electric motor of the blower.

By means of the present invention, the operation of a Yankee press can be intensified so that drying of the paper is more advantageous in view of the overall energy economy. This is because, in view of the energy economy, dewatering that takes place by pressing is substantially more advantageous than dewatering that takes place by evaporation, e.g., in the Yankee hood.

The blow box of the device in accordance with the invention is provided with a blow air chamber and an exhaust-air chamber. The exhaust air of the Yankee hood is used as the source of energy (blow air) for the blow box. Warm humid air, removed from the Yankee hood, is blown through the nozzles in the blow device against the web. The cooled and dried air, obtained after the air flow contacts with the web, is directed through suction ducts provided in the blow box back to the air system of the Yankee hood, from which it can be passed further to heat recovery means.

In the device of the invention, a relatively high blow velocity is used in order to prevent contamination of the device. Thus, the device of the invention is well suitable for the problematic environment in the press section of a paper machine where contamination of the nozzles by loose web particles is likely.

By means of the device of the invention, it is also possible to adjust an uneven moisture profile by dividing or partitioning the blow chamber into blocks, in which blocks the blow velocity (air quantity) can be regulated separately as required.

If it is not desirable to increase the capacity of a paper machine, it is also possible by means of the present invention to lower the additional energy required in the dryer section. This results from the feature that the dry solids content of the web after the press nip(s) is higher and, thereby, the requirement of drying power is lowered.

The method and the device in accordance with the invention can be employed in press sections of paper machines that operate at speeds of between about 600 m/min to about 2200 m/min. By means of the invention, an increase of about 3% to about 10%, preferably about 5%, in the running speed of the web is achieved if the advantage obtained from the invention is used in the form of increased running speed.

The method and the device in accordance with the invention are suitable for use in connection with Yankee presses, in particular for gas-heated or high-temperature Yankee presses, for the manufacture of soft tissue. However, it is entirely possible that the method and device in accordance with the invention can be used in other types of drying and pressing operations in paper machines.

BRIEF DESCRIPTION OF THE DRAWINGS

The following drawings are illustrative of embodiments of the invention and are not meant to limit the scope of the invention as encompassed by the claims.

DETAILED DESCRIPTION OF THE INVENTION

Figure 1:
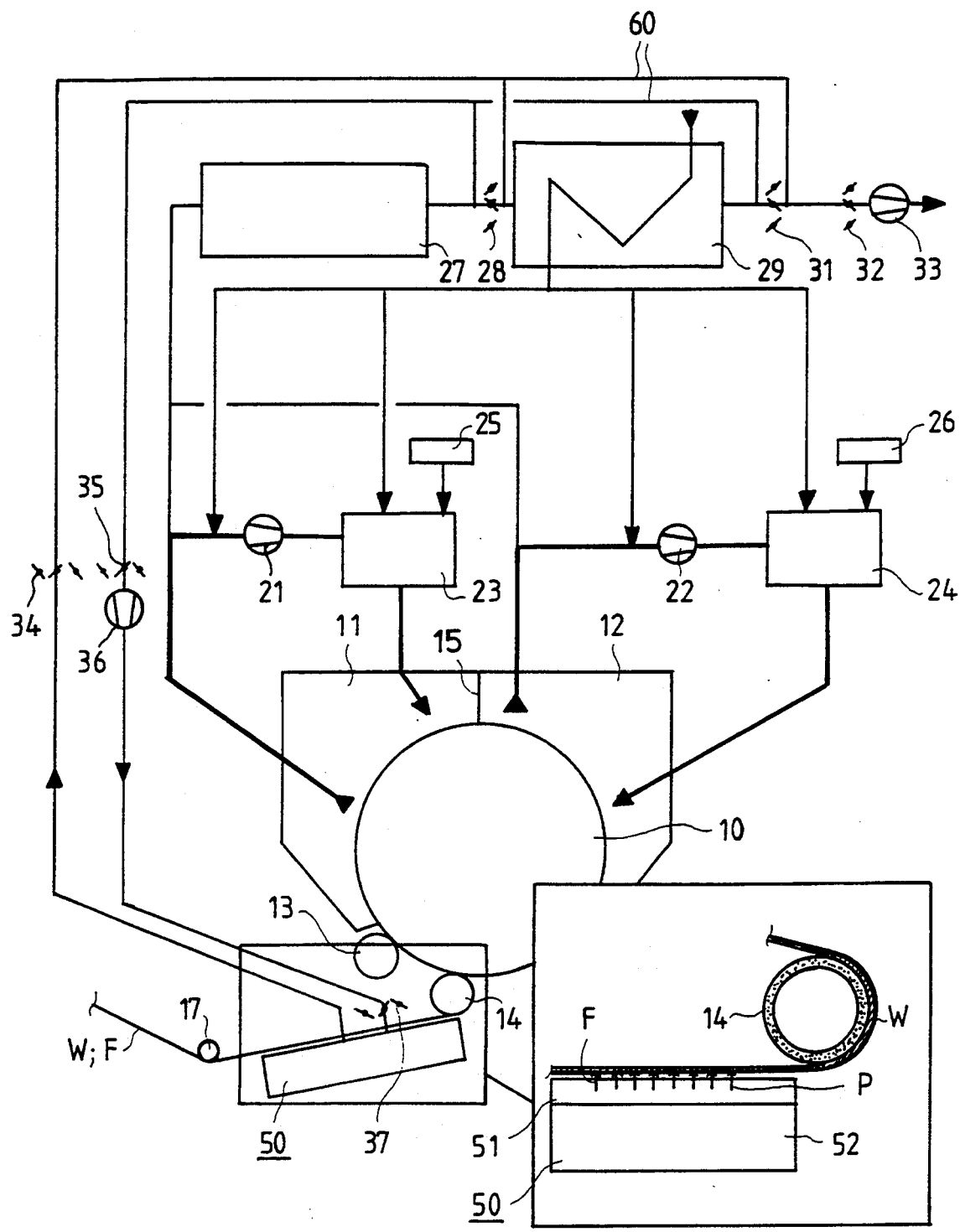
FIG. 1 is a schematic illustration of a device and method in accordance with the present invention as applied to a Yankee press with two nips.

FIG. 1 shows a schematic illustration of an exemplifying embodiment of the present invention as applied to a Yankee press with two nips. The Yankee press comprises a large-diameter Yankee cylinder 10 that is heated from inside, i.e., from its interior in a manner known in the art. A hood 15 of the Yankee cylinder 10 includes two hood blocks 11 and 12. The blow air, which will be blown against the web through the hood blocks 11,12, is heated by means of heaters 23,24, respectively, or other heat transfer means. The fuel tanks of the heaters 23,24 are denoted with reference numerals 25,26, respectively. The blower of the first block 11 of the hood 15 is denoted with reference numeral 21, and the blower of the second block 12 of the hood 15 is denoted with reference numeral 22. The temperature of exhaust air 27 emanating from the hood 15 is about 200° C. to about 350° C. and the humidity of the exhaust air 27 is about 0.2 to about 0.7 kg $H_2O$ per kg of dry air. The members for regulation, i.e., regulation means, of the exhaust air 27 are denoted with reference numeral 28. The exhaust air 27 is passed through regulation means 28 to a heat recovery device 29 of the hood 15, from which the air is, if necessary, removed through regulation members 31 and 32 and through a blower 33. Alternatively, if desired, the air is returned to the air circulation system of blocks 11,12 of the hood 15.

In the illustrated embodiment of a Yankee press shown in FIG. 1, press rolls 13 and 14 form two successive press nips with the Yankee cylinder 10. In accordance with the invention, a blow device 50 is placed in proximity to the first press roll 14, and preferably before the press roll 14 in the running direction of the paper web W. The paper web W and a press felt F are passed over a guide roll 17 to run over the blow device 50 into the first nip between the first press roll 14 and the Yankee cylinder 10. The web W and felt F are then passed into the second nip formed by the second press roll 13 and the Yankee cylinder 10.

The exhaust air from the Yankee hood 15 is used as the source of energy for the blow box 50, i.e., as the blow air. The exhaust air is passed through a blow-velocity regulation member 35 and a blower 36 into a blow-air chamber 51 of the blow device 50. The exhaust air, which is hot and humid, is directed against the web such that the exhaust air is cooled and dried. The exhaust air is then sucked into the exhaust-air chamber 52 of the blow box 50 and returned to the heat recovery device 29 through an exhaust air regulation member 34. By means of the blow device 50, the warm, humid air from the Yankee hood is blown through nozzles, preferably circular nozzles, against the paper web W. The cooled and dried air is recovered and drawn through suction ducts/exhaust-air pipes 53 provided in the blow box 50 and directed back to the air circulation system of the Yankee hood 15. From the air system of the Yankee hood, the cooled and dried air can be passed further to the heat recovery device 29. Alternatively, the cooled and dried air can be passed completely out of the system via regulation member 32 and blower 33.

In FIG. 1, reference numeral 60 represents an alternative air intake/exhaust position of the blow device 50.

The output of the blow device 50 is regulated by means of the regulation members 35 placed in the air ducts and/or distribution ducts. In the blow device 50, a relatively high blow velocity is used in order to prevent contamination of the device 50 by contaminants clogging the nozzles and air ducts.

Figure 4:
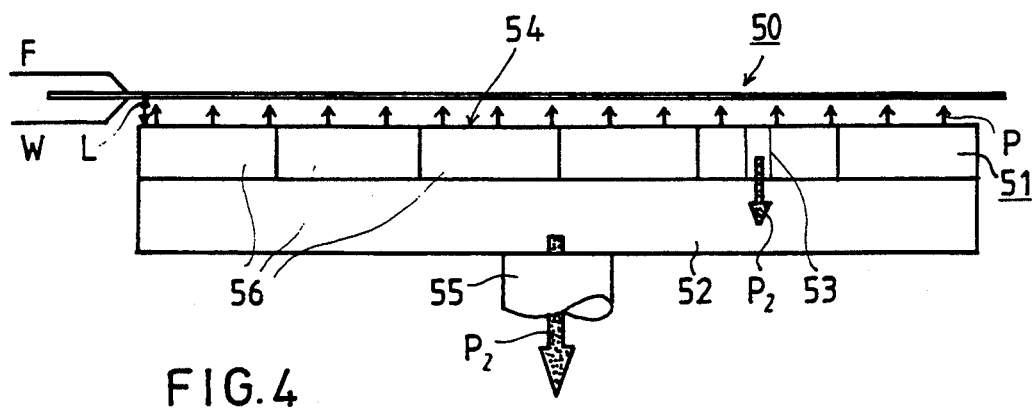
FIG. 4 is a schematic sectional view of the device in accordance with the invention taken in the transverse direction of the web.

Referring to FIG. 4, by means of the blow device 50, it is also possible to correct an uneven moisture profile of the paper web by dividing or partitioning the blow chamber 51 into several blocks 56, in which the blow velocities are regulated individually by means of regulation members 37.

Figure 2A:
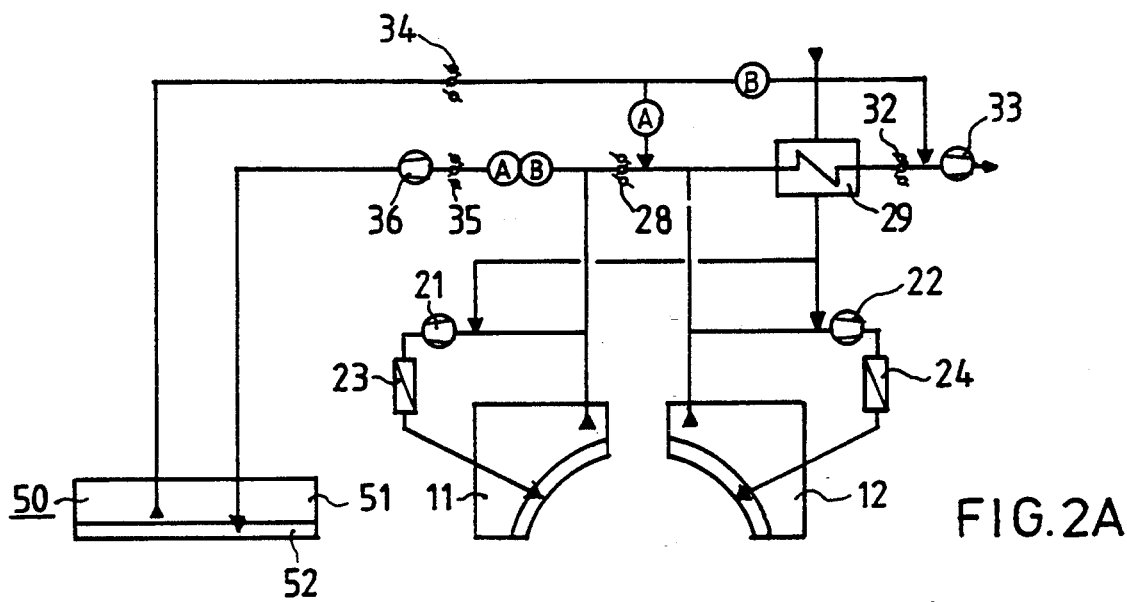
FIGS. 2A, 2B and 2C are schematic illustrations of different alternative modes for circulating air in the method and device in accordance with the present invention.
Figure 2B:
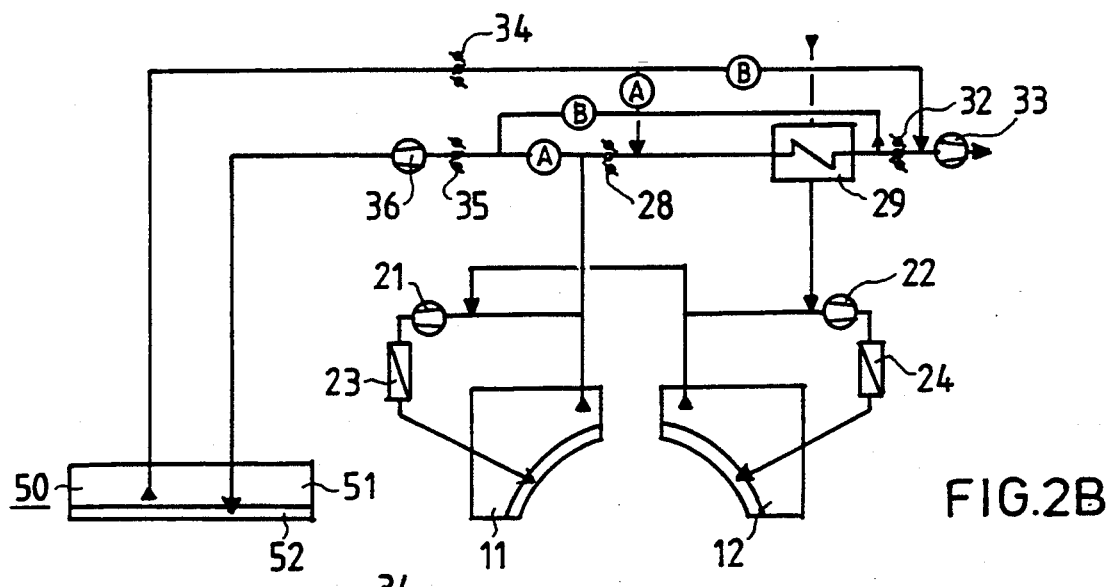
Figure 2C:
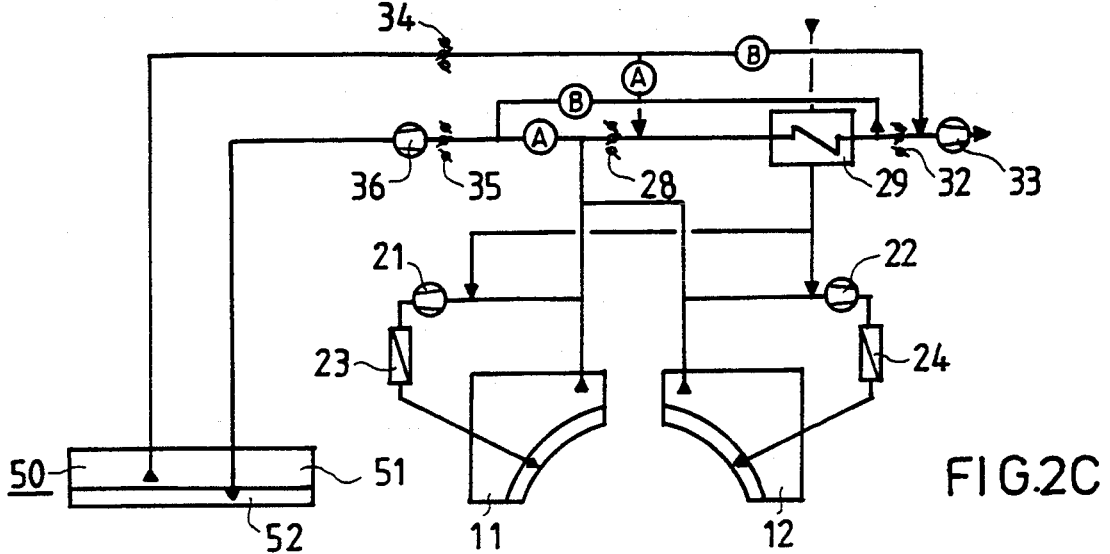

FIGS. 2A, 2B and 2C illustrate different alternative modes for circulating air which can be used in the method and device in accordance with the present invention.

Referring to FIG. 2A, in the alternatives A and B (encircled), the circulation means of air in the Yankee hood blocks 11,12 are connected in parallel, and air is passed to the blow box 50 in the following manner.

In alternative A, blow air is directed to the blow box 50 from the outlet of the block 11 before the outlet air from block 11 passes through a possible heat recovery device 29. The exhaust air from the blow box 50 is passed back to the outlet of the block 11 of the air system of the hood 15 before the outlet air passes through the heat recovery device 29, and also preferably after the blow air has already been directed to the blow box 50.

In alternative B, the blow air is directed to the blow box 50 from the outlet of the block 11 before the outlet air passes through a possible heat recovery device 29. The exhaust air from the blow box 50 is passed back to the common outlet of the air system of the hood 15 after the heat recovery device 29. Thereafter, the exhaust air can be passed out of the system through blower 33.

In the alternatives A and B (encircled) as shown in FIG. 2B, the circulation system of air of the Yankee hood blocks 11,12 are connected in series. The outlet air from the second hood block 12 is passed to the inlet of the first hood block 11 before the blower 21. The air is passed to the blow box 50 from the first hood block 11 as follows:

In alternative A, the blow air is directed to the blow box 50 from the outlet of the first hood block 11 before the outlet air of the first hood block 11 passes through a possible heat recovery 29. The exhaust air from the blow box 50 is passed back to the outlet of the air system of the hood 15 before the heat recovery system 29.

In alternative B, the blow air is directed to the blow box 50 from the outlet of the block 11 after the heat recovery system 29. The exhaust air from the blow box 50 is passed back to the outlet of the air system of the hood 15, after possible heat recovery system 29. The exhaust air can then be removed from the system via blower 33.

In the alternatives A and B (encircled) as shown in FIG. 2C, the circulation of air of the Yankee hood blocks 11,12 is connected in parallel such that there is a common outlet for the exhaust air from the first hood block 11 and the second hood block 12. Air is passed to the blow box 50 as follows:

In alternative A, the blow air is directed to the blow box 50 from the common outlet of the hood blocks 11,12 before the heat recovery system 29, if present. The exhaust air of the blow box 50 is passed back to the common outlet of the air system of the hood 15, before the heat recovery system 29, if present. Preferably the exhaust air is passed back to the common outlet after the blow air being directed to the bow box 50 has already been removed from the common outlet.

In alternative B, the blow air for the blow box 50 is taken from the common outlet of the hood blocks 11,12 after the heat recovery system 29, if present. The exhaust air from the blow box 50 is passed back to the common outlet of the air system of the hood 15 after possible heat recovery. Preferably the exhaust air is passed back to the common outlet after the blow air being directed to the bow box 50 has already been removed from the common outlet.

In all of the alternative embodiments illustrated in FIGS. 2A, 2B and 2C and as described above, the alternatives A and B may also be cross-connected, i.e., the air for the blow box 50 is taken before the heat recovery 29, and the exhaust air from the blow box 50 is returned to the air system of the hood 15 after the heat recovery 29.

In addition to the embodiments illustrated in the figures, it is, of course, also possible to employ a hood 15 that comprises three blocks whereby the air is taken to the blow box 50 from either one, two, or from all three of the blocks. If air is taken from one block only, it is preferably taken from the block placed next to the wet end where the web enters into the Yankee hood.

In the blow device 50 in accordance with the invention, the following parameters are the preferential parameters:

the temperature of the blow air is between about 130° C. and about 450° C., preferably between about 200° C. and about 350° C.;

the humidity of the blow air is between about 0.100 and about 1.000 kg of $H_2O$ per kg of dry air, preferably between about 0.200 and about 0.700 kg of $H_2O$ per kg of dry air; and the blow velocity of the blow device 50 is between about 0 and about 130 meters per second, preferably between about 60 m/s and about 120 m/s.

The specification of these parameters by no means excludes other possible variations of the temperature, humidity and blow velocity of the blow air which would achieve the desired results of the present invention.

Figure 3:
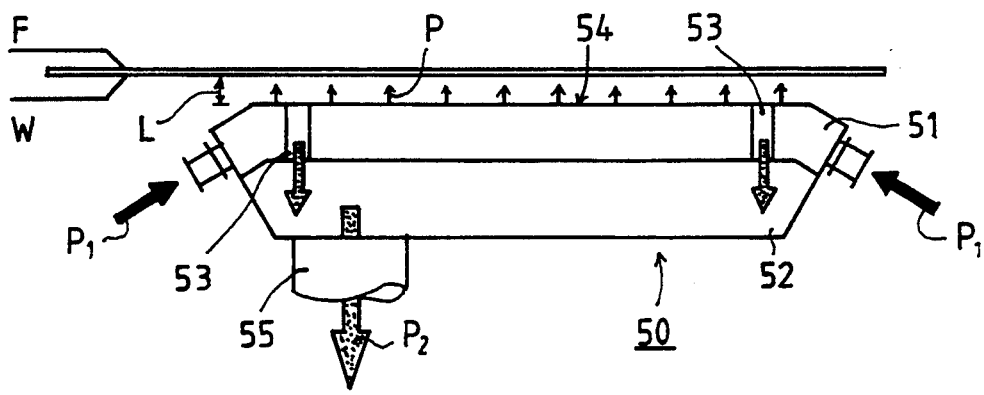
FIG. 3 is a schematic sectional view of a device in accordance with the invention taken in the direction of the web.

FIG. 3 is a schematic sectional view of the blow device 50 taken in the travelling direction of the web. The felt is denoted with reference F and the web with reference W. The blow box 50 comprises a blow chamber 51 and an exhaust chamber 52. Exhaust air $P_1$ from the Yankee hood 15 is passed into the device 50 and into the blow chamber 51. From the blow chamber 51, the air is blown against the web W as the blow P directed through the nozzles, preferably circular nozzles, placed in the nozzle face 54. The nozzles 54 are oriented toward the web. The exhaust air $P_2$ is passed through the exhaust air pipes 53 in the suction ducts into the exhaust chamber 52. The exhaust air $P_2$ is passed from the exhaust chamber 52 further to the outlet/heat recovery of the air system of the Yankee hood 15.

A given distance, i.e., the blow distance L, is provided between the upper face of the blow box 50 and the lower face of the web W which is running on the press felt F. The nozzles, through which the blow air is blown, can be arranged in the upper face of the blow box 50.

FIG. 4 is a schematic sectional view of the blow device 50 taken in the transverse direction of the web. The felt is denoted with reference F and the web with reference W. In the embodiment illustrated in FIG. 4, the blow chamber 51 has been divided into so-called profiling chambers 56, in which the air flow of each chamber 56 can be separately regulated. Air is blown, as an air flow P against the web W, out of the profiling chambers 56 of the blow chamber 51 through the nozzles in a nozzle face 54 of the blow box 50. The exhaust air $P_2$ is passed out of the space between the blow box 50 and the web W through the exhaust pipes 53 into the exhaust chamber 52. The air is passed from the exhaust chamber 52 further into the duct 55 and, thus, into the outlet of the air system of the Yankee hood 15.

Figure 5A:
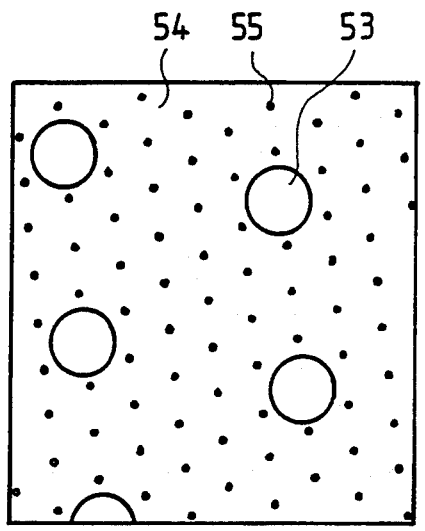
FIGS. 5A and 5B are schematic illustrations of different alternative embodiments of the nozzle face of the device in accordance with the invention.
Figure 5B:
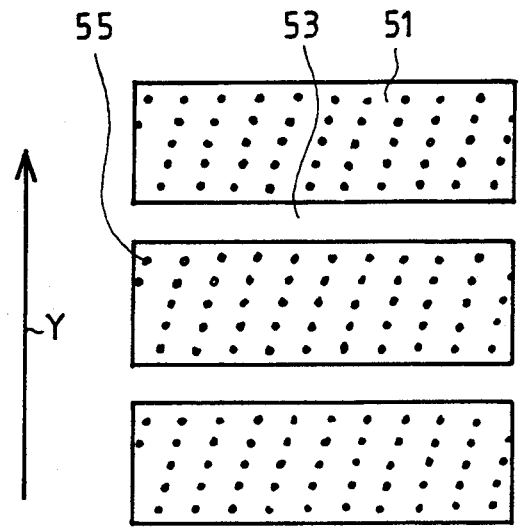

FIGS. 5A and 5B illustrate two different alternative nozzle faces 54 of the blow device 50. The blow nozzles are denoted with reference numeral 55 and the exhaust-air pipes/exhaust-air slots with reference numeral 53. The machine direction is represented by reference arrow Y.

In FIG. 5A, the small-diameter blow-nozzle openings 55 and the large-diameter exhaust-air pipes 53 are arranged to be uniformly spaced on the planar nozzle face 54 of the blow device 50 and in a direction parallel to the running direction of the web W. In the embodiment illustrated in FIG. 5B, the nozzle face 54 is divided into blocks in which alternate portions are provided with blow nozzles 55 and other portions are provided with exhaust-air pipes, or exhaust-air slots, 53.

The diameter of the blow nozzles 55 is about 5 mm to about 10 mm, and the diameter of the exhaust-air pipes 53 is about 50 mm to about 100 mm. If an exhaust-air slot 53 is used, e.g., as shown in FIG. 5B, its width is about 20 mm to about 100 mm and the open area of the blow nozzles 55 in proportion to the nozzle-face area is about 1% to about 5%. The blow distance L between the nozzle face 54 and the web W is about 15 mm to about 50 mm.

Figure 6:
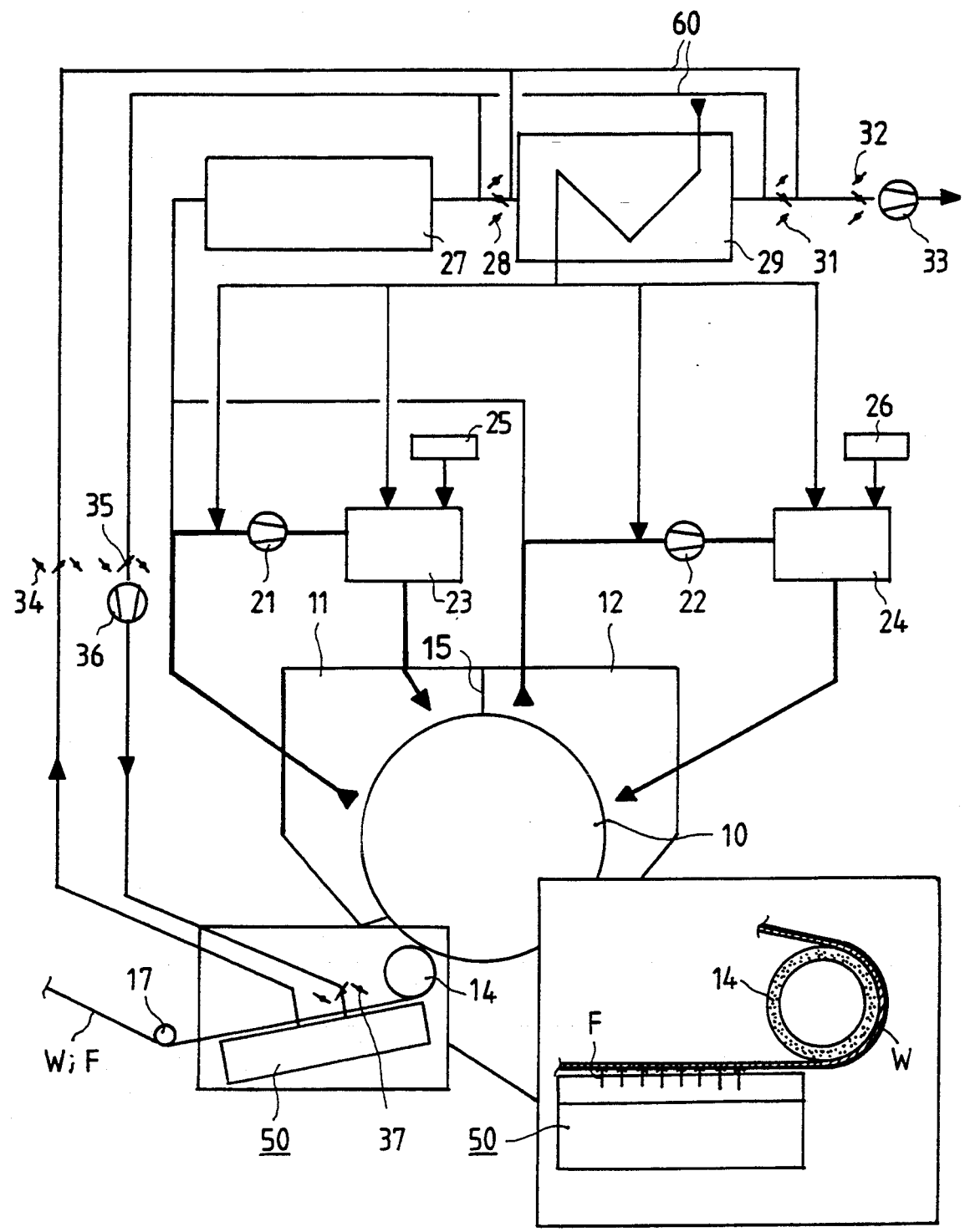
FIG. 6 is a schematic illustration of a principle of the method of the present invention as applied to a single-nip Yankee press.

FIG. 6 is a schematic illustration of an additional embodiment of the principle of the method of the invention in a single-nip Yankee press. Unless otherwise indicated, the illustration in FIG. 6 is similar to that shown in FIG. 1 and the same reference numerals describe the same elements.

In this embodiment, the Yankee cylinder 10 is arranged to define only one nip with the press roll 14. The blow box 50 is arranged in proximity to and before the nip.

The examples provided above are not meant to be exclusive. Many other variations of the present invention would be obvious to those skilled in the art, and are contemplated to be within the scope of the appended claims.

We claim:

1. A method in a soft-tissue paper machine for intensifying the operation of a Yankee press in which at least one press roll is arranged adjacent to a Yankee cylinder to form a nip therebetween in which a web is pressed, and air is introduced into the Yankee press and blown against the web through a Yankee hood arranged over said Yankee cylinder to dry the web running on said Yankee cylinder, the method comprising the steps of:

arranging a blow box in proximity to and before the nip in a running direction of the web, directing hot and humid air from said Yankee hood into said blow box, blowing the hot and humid air from said blow box against the web, drawing the air after it has been blown against the web into said blow box, and directing the air drawn into said blow box from said blow box as exhaust air to be removed from the Yankee press and outlet to the external environment.

2. The method of claim 1, further comprising the steps of lowering the viscosity of water present in the web and improving the pressing quality of the water present in the web by heating the web, the web being heated by the effect of the hot and humid air being blown against the web through the blow box such that the web is heated by forced convection, and by the liberation of the evaporation energy of water present in the hot and humid air as water condenses in the web surface.

3. The method of claim 1, further comprising the steps of:

directing hot and humid air directly from said Yankee hood to said blow box without passing through intermediate structures, and passing exhaust air directly from said blow box to an outlet of said Yankee press without the exhaust air passing through intervening structures.

4. The method of claim 1, further comprising the step of providing a plurality of hood blocks in said Yankee hood, and regulating the velocity of air being blown against the web through each of said plurality of hood blocks such that the moisture profile of the web is adjusted.

5. The method of claim 1, further comprising the step of carrying the web on a felt in the Yankee press, and guiding the felt carrying the web thereon over said blow box.

6. The method of claim 1, further comprising the steps of recovering heat from the hot and humid air being removed from said Yankee hood in an outlet/heat recovery system and utilizing the recovered heat to heat the air being introduced into said Yankee hood to be blown against the web.

7. The method of claim 5, further comprising the steps of
partitioning said Yankee hood into a first hood block and a second hood block,
connecting in parallel the air circulation in said first hood block and said second hood block,
directing hot and humid air from an outlet of said first hood block to heat recovery means in said outlet/heat recovery system,
directing a portion of the hot and humid air in the outlet of said first hood block to said blow box before the air in the outlet of said first hood block passes through said heat recovery means, and
passing the exhaust air from said blow box to the outlet of said first hood block before air in the outlet of said first hood block passes through said heat recovery means.

8. The method of claim 5, further comprising the steps of
partitioning said Yankee hood into a first hood block and a second hood block,
connecting in parallel the air circulation in said first hood block and said second hood block,
directing hot and humid air from an outlet of said first hood block to heat recovery means in said outlet/heat recovery system,
directing a portion of the hot and humid air in the outlet of said first hood block to said blow box before the air in the outlet of said first hood block passes through said heat recovery means, and
passing the exhaust air from said blow box to a common outlet of said Yankee hood such that the exhaust air does not pass through said heat recovery means.

9. The method of claim 6, further comprising the steps of partitioning said Yankee hood into a first hood block and a second hood block,
connecting in series said first hood block and said second hood block such that said first hood block and said second hood block have a common outlet in which hot and humid air passes,
directing hot and humid air from said common outlet to heat recovery means in said outlet/heat recovery system,
directing a portion of the hot and humid air in said common outlet to said blow box before the air in said common outlet passes through said heat recovery means, and
passing the exhaust air from said blow box to said common outlet before air in said common outlet passes through said heat recovery means.

10. The method of claim 6, further comprising the steps of
partitioning said Yankee hood into a first hood block and a second hood block,
connecting in series said first hood block and said second hood block such that said first hood block and said second hood block have a common outlet in which hot and humid air passes,
directing hot and humid air from said common outlet to heat recovery means in said outlet/heat recovery system,
directing a portion of the hot and humid air in said common outlet to said blow box after the air in said common outlet passes through said heat recovery means, and
passing the exhaust air from said blow box to said common outlet after air in said common outlet passes through said heat recovery means.

11. The method of claim 6, further comprising the steps of
partitioning said Yankee hood into a first hood block and a second hood block,
connecting in parallel said first hood block and said second hood block such that an outlet of said first hood block is connected to an outlet of said second hood block to thereby form a common outlet in which hot and humid air passes,
directing hot and humid air from said common outlet to said blow box before the air in said common outlet passes through heat recovery means in said outlet/heat recovery system, and
passing the exhaust air from said blow box to said common outlet before the air in said common outlet passes through said heat recovery means.

12. The method of claim 6, further comprising the steps of
partitioning said Yankee hood into a first hood block and a second hood block,
connecting in parallel said first hood block and said second hood block such that an outlet of said first hood block is connected to an outlet of said second hood block to thereby form a common outlet in which hot and humid air passes,
directing hot and humid air from said common outlet to said blow box after the air in said common outlet passes through heat recovery means in said outlet/heat recovery system, and
passing the exhaust air from said blow box to said common outlet after the air in said common outlet passes through said heat recovery means.

13. The method of claim 6, further comprising the steps of regulating the flow of the air from said Yankee hood to said blow box and regulating the flow of exhaust air from said blow box to said outlet/heat recovery system of said Yankee hood.

14. A device in a soft-tissue paper machine for intensifying the operation of a Yankee press in which at least one press roll is arranged adjacent to a Yankee cylinder to form a nip therebetween in which a web is pressed and in which air is introduced into the Yankee press and blown against the web through a Yankee hood arranged over said Yankee cylinder to dry the web running on said Yankee cylinder, comprising a blow device comprising means for defining a blow chamber having blow nozzles for directing air against the web from said blow device and means for defining an exhaust air chamber having exhaust-air ducts for drawing air away from the web, means for removing hot and humid air from the Yankee hood and passing the hot and humid air through said blow chamber to said blow nozzles, and means for passing exhaust air drawn into said exhaust chamber from said exhaust chamber to be removed from the Yankee press and outlet to the external environment, said blow device being arranged in proximity to and before the nip in a running direction of the web.

15. The device of claim 14, wherein said blow device further comprises a substantially planar nozzle face arranged in a direction parallel to the running direction of the web, said blow nozzles comprising small-diameter blow-nozzle openings formed in said nozzle face, said exhaust-air ducts comprising exhaust openings having a diameter larger than said small-diameter blow-nozzle openings and being formed in said nozzle face.

16. The device of claim 15, wherein said nozzle face comprises specific portions containing said blow nozzle openings and other specific portions containing said exhaust openings alternating with said portions containing said blow nozzle openings.

17. The device of claim 14, wherein said means defining the blow chamber further comprise individual profiling chambers in which the air flow is regulated separately to thereby regulate a moisture profile of the web.

18. The device of claim 14, further comprising a felt for carrying the web through the Yankee press, and guide means for guiding the felt carrying the web thereon over said blow device.

19. The device of claim 14, further comprising an outlet and/or heat recovery system for recovering heat from the hot and humid air removed from the Yankee hood before the hot and humid air is passed to said blow device and for recovering heat from the exhaust air before the exhaust air is removed from the Yankee press and outlet to the external environment, the recovered heat being utilized to heat the air being introduced into the Yankee hood to be blown against the web.

20. The device of claim 19, further comprising regulation members arranged to regulate the velocity and pressure of the hot and humid air being passed to said blow device from said outlet and/or heat recovery system of the Yankee hood and the velocity and pressure of the exhaust air being passed from said blow device to said outlet and/or heat recovery system of the Yankee hood.

* * * * *